US008868964B2

(12) United States Patent
Bagga et al.

(10) Patent No.: US 8,868,964 B2
(45) Date of Patent: Oct. 21, 2014

(54) METHOD AND APPARATUS FOR SUPPORTING FAILOVER FOR LIVE STREAMING VIDEO

(71) Applicant: Adobe Systems Inc., San Jose, CA (US)

(72) Inventors: Karishma Bagga, Bhopal (IN); Apoorva Arora, Noida (IN); Neha Saxena, New Delhi (IN)

(73) Assignee: Adobe Systems Incorporated, San Jose, CA (US)

( * ) Notice: Subject to any disclaimer, the term of this patent is extended or adjusted under 35 U.S.C. 154(b) by 179 days.

(21) Appl. No.: 13/681,877

(22) Filed: Nov. 20, 2012

(65) Prior Publication Data
US 2014/0143590 A1  May 22, 2014

(51) Int. Cl.
G06F 11/00 (2006.01)
(52) U.S. Cl.
USPC .......................................... 714/4.11; 714/4.1
(58) Field of Classification Search
CPC .................. G06F 11/2023; G06F 11/2025
USPC .................. 714/4.11, 4.1, 4.12, 4.2, 4.21, 4.3
See application file for complete search history.

(56) References Cited

U.S. PATENT DOCUMENTS

| 7,529,784 B2* | 5/2009 | Kavuri et al. ........................ 1/1 |
| 7,694,170 B2* | 4/2010 | Callaway et al. ............... 714/4.1 |
| 2011/0096828 A1* | 4/2011 | Chen et al. ............... 375/240.02 |
| 2012/0060053 A1* | 3/2012 | White et al. .................... 714/6.3 |
| 2013/0246643 A1* | 9/2013 | Luby et al. ..................... 709/231 |

* cited by examiner

Primary Examiner — Dieu-Minh Le
(74) Attorney, Agent, or Firm — Moser Taboada

(57) ABSTRACT

A computer implemented method and apparatus for receiving, at a first media content packager, a request for at least one of an index file of media segments or a media segment; creating, in response to the request for an index file, an index file comprising a plurality of universal resource locators (URLs); and sending, from the media content packager an error message when at least one of: (i) in response to a request for an index file, the created index file is determined to comprise media segments that have previously been sent from a media packager, or (ii) in response to a request for a media segment, at least one of the URLs in the index file references media content that is not available on the first packager, or a media segment is incomplete, wherein sending the error message results in receiving the request at a second media content packager.

20 Claims, 3 Drawing Sheets

METHOD AND APPARATUS FOR SUPPORTING FAILOVER FOR LIVE STREAMING VIDEO

BACKGROUND OF THE INVENTION

1. Field of the Invention

Embodiments of the present invention generally relate to live streaming and, more particularly, to a method and apparatus for supporting failover for live streaming video.

2. Description of the Related Art

In content delivery networks that deliver media content to media servers, an encoder receives media content from a source and sends the content in a media stream to one or more packagers. Upon receipt of the media stream, the packager separates the media stream into fragments of a predefined duration, for example, 4 seconds each. All of the packagers receive the same media content and generate the same fragments. The packager also generates a bootstrap file that comprises information regarding the start time of each fragment, the duration of each fragment and the current media time of the stream. The fragments and the bootstrap file are stored in memory. The packagers continue to receive streams of media content for the duration of a program. As streams are received, the packagers generate media fragments and update the bootstrap file with information regarding the new fragments. When a client device is ready to play the program, the client device sends a request to a reverse proxy server for an index file comprising a playlist of media segments. The reverse proxy server selects one of the packagers and forwards the request to the selected packager.

In response to a request for the index file, the packager refers to the bootstrap file and dynamically generates an index file comprising a list of media segments and a location of each media segment. The index file is sent through to the reverse proxy server, which sends the index file on to the client device. The client device then reads the index file and sends a request to the reverse proxy server for a media segment listed in the index file. The reverse proxy server then sends the request to a packager. When a request for the media segment is received by the packager, the packager dynamically converts one or more fragments into the requested media segment. For example, a media segment may comprise ten seconds of content. Each fragment may comprise four seconds of content. As such, the packager creates the requested media segment from multiple fragments. The packager sends the requested media segment to the reverse proxy server, which then sends it to the client device.

Playback of the media content can suffer when a packager is not able to get current media content due to poor connectivity with an encoder or other service interruption, such as when a packager stops working for a period of time. Liveness refers to the timeliness of playback, which suffers when a connection is lost either temporarily or permanently between the encoder and the packager. When the connection is lost, the packager does not receive new media content and continues to send non-current, or stale, index files to the client device. Dropout refers to the loss of a connection for some period of time between the encoder and the packager. When dropout occurs, media content is supplied to the client device, but there is a gap in the content for the period of time the connection between the encoder and the packager was interrupted. Partial content refers to the client device retrieving a media segment that contains fewer seconds of content than a configured duration. For example, the media segment should contain, for example, ten seconds of content, but contains only seven seconds of content.

These three scenarios namely, liveness, dropout, and partial content result in a poor experience for the viewer of the media content. Currently, when liveness occurs, the client device may replay old content that has already been played on the client device. When dropout or partial content occurs, no content is played for the missing time.

Therefore, there is a need for a method and apparatus for improving live streaming video.

SUMMARY OF THE INVENTION

A method and apparatus for supporting failover for live streaming video substantially as shown in and/or described in connection with at least one of the figures, as set forth more completely in the claims.

These and other features and advantages of the present disclosure may be appreciated from a review of the following detailed description of the present disclosure, along with the accompanying figures in which like reference numerals refer to like parts throughout.

Figure 1:
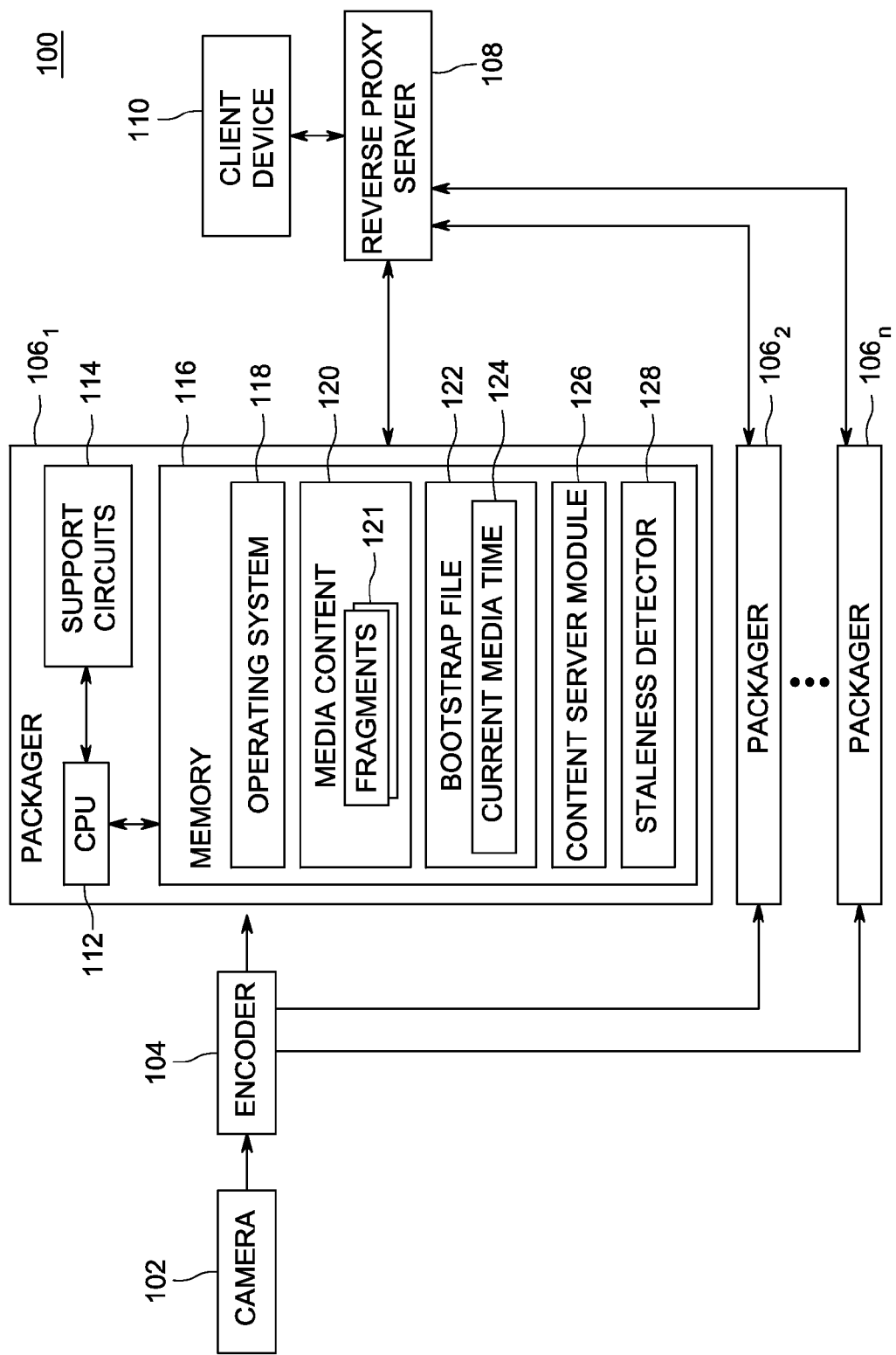
FIG. 1 is a block diagram of a system for supporting failover for live streaming video, according to one or more embodiments.

While the method and apparatus is described herein by way of example for several embodiments and illustrative drawings, those skilled in the art will recognize that the method and apparatus for supporting failover for live streaming video is not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the method and apparatus for supporting failover for live streaming video defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Embodiments of the present invention comprise a method and apparatus for supporting failover (automatic switching to a redundant or standby server) for live streaming video. When a request for media content is received from a reverse proxy server, the packager determines if the media content on the packager is current. The packager compares the timestamp of the bootstrap file to the current time. When media content is received on the packager, the bootstrap file is updated and saved. Therefore, if the bootstrap file is current, the media file is determined to be current. If the amount of time between the current time and the timestamp of the bootstrap file exceed a threshold period of time, it is determined that the media content on the packager is not current, and the packager sends an error message to the reverse proxy server. However, if the amount of time between the current time and the timestamp of the bootstrap file is within a threshold period of time, the media content is determined to be current and the packager proceeds with generating the index file. The index file comprises a list of media segments with a location of each media segment, in the form of a URL. The index file also comprises a duration for each media segment.

In the situation where the connection between an encoder and a packager failed, but has since resumed, an updated bootstrap file is available with the current media content, meaning the amount of time between the current time and the timestamp of the bootstrap file is within a threshold period of time. However, the bootstrap file contains gaps for the time period when the media content was not received. When the packager generates the index file, one or more media fragments in the media content may be missing (due to the failed connection when the encoder sent the media content to the packager). The packager creates dummy URL entries for the media segments generated from the missing media fragments.

When a packager sends the index file to the reverse proxy server, the reverse proxy server sends the index file to the client device. The client device then sends a request to the reverse proxy server for a media segment. The index file comprises a list of URLs that the client device requests one at a time. The reverse proxy server selects a packager, either at random or in turn, and sends the request for the media segment to the packager.

When the packager receives a request for a media segment, the packager checks if it has the corresponding media content fragments to generate and serve the media segment. If the packager does not have the corresponding media content fragments to generate and serve the media segment, meaning the connection between the encoder and this packager had failed, the packager sends an error message to the reverse proxy server, which sends the request for the media segment to a different packager.

When a packager has the corresponding media content fragments to generate and serve the media segment, the packager determines whether the segment is a complete segment or a partial segment. If the connection between the encoder and the packager failed during the streaming of the requested segment, then part of the requested segment may be missing; for example, what should be a ten second media segment may contain only seven seconds of media content. If the packager determines that only a partial segment exists on the packager, the packager sends an error code to the reverse proxy server, which sends the request for the media segment to a different packager.

However, if the media segment is complete, the packager sends the requested media segment to the reverse proxy server, which then sends the media segment to the client device.

Advantageously, the present invention provides a method for improving the live streaming media experience. The present invention addresses issues created by an interruption of service when receiving media content from an encoder. Although liveness, dropout, and partial content may cause the end user experience to suffer, the present invention addresses these issues and results in uninterrupted viewing of streaming video.

Various embodiments of a method and apparatus for supporting failover for live streaming video are described. In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

FIG. 1 is a block diagram of a system 100 for supporting failover for live streaming video, according to one or more embodiments. The system 100 comprises a camera 102, an encoder 104, a plurality of packagers $106_1$, $106_2$ ... $106_n$ (collectively referred to as packagers 106), a reverse proxy server 108, and a client device 110. The client device 110 is any device capable of receiving and playing live streaming media content, such as a media player, a browser, and the like. Although only a single client device 110 is shown, a plurality of client devices 110 is also possible. The reverse proxy server 108 may be a virtual server or a physical server. The packager 106 may be any media server capable of receiving encoded media content and generating media segments, such as ADOBE® Media Server, and the like. The packagers 106 each comprise a Central Processing Unit (CPU) 112, support circuits 114, and a memory 116. The CPU 112 may comprise one or more commercially available microprocessors or microcontrollers that facilitate data processing and storage. The various support circuits 114 facilitate the operation of the CPU 112 and include one or more clock circuits, power supplies, cache, input/output circuits, and the like. The memory 116 comprises at least one of Read Only Memory (ROM), Random Access Memory (RAM), disk drive storage, optical storage, removable storage and/or the like. The memory 116 comprises an operating system 118, media content 120, a bootstrap file 122, a content server module 126, and a staleness detector 128. The bootstrap file 122 comprises a current media time 124. The media content 120 comprises a plurality of fragments 121.

The encoder 104 may reside with media publishing firms, such as CNN or other media content provider. Media content is acquired by the camera 102. The camera 102 is communicatively coupled, for example via a recorder (not shown), to the encoder 104. The encoder 104 receives the media content from the camera 102. The encoder 104 is communicatively coupled to a plurality of packagers 106. The encoder 104 digitally encodes the media content and streams the media content to the packagers 106. Each packager 106 in the plurality of packagers 106 receives the same media content 120 from the encoder 104. Upon receipt of the media content 120, each packager 106 divides the media content 120 into fragments 121 and creates or updates the bootstrap file 122 with information regarding the received media fragments 121. The media content 120 and the bootstrap file 122 are stored in the memory 116. Each packager 106 in the plurality of packagers 106 is communicatively coupled to a reverse proxy server 108, which is further communicatively coupled to a client device 110. Communicative coupling may be provided by any process for transferring media content, such as via the Internet or other transmission system.

When a client device 110 prepares to play media content 120, it sends a request for an index file containing a playlist of the desired media content 120 to the reverse proxy server 108, which forwards the request to one of the packagers 106. In some embodiments, the reverse proxy server 108 selects the packager 106 to which it sends the request randomly. In some embodiments, the reverse proxy server 108 selects the packager 106 to which it sends the request in turn. When a packager 106 receives a request for media content 120, the content server module 126 compares the timestamp of the bootstrap file 122 to the current time. If the bootstrap file 122 has not been updated within a predefined period of time, the content server module 126 concludes that the media content 120 on the packager is not current and instead of returning an index file to the reverse proxy server 108, the content server module 126 returns an error code indicating that the media content 120 is stale, meaning the media content 120 on the packager 106 is no longer current. When the reverse proxy server 108 receives the error code from the content server module 126, the reverse proxy server 108 sends the request for the index file to a different packager 106. The reverse proxy server 108 may select the different packager 106 randomly or in turn. If the reverse proxy server 108 receives an error code from the different packager 106, the reverse proxy server 108 requests the index file from yet another packager 106. If an error code is received from every available packager 106, the reverse proxy server 108 sends an error code to the client device 110 indicating that the media content cannot be found.

However, if the content server module 126 determines the content is not stale, the content server module 126 generates an index file for media content 120 for a predefined duration of time from the current media time 124, for example 100 seconds. The index file comprises a list of URLs identifying the locations of the media segments and the duration of each media segment. Each URL indicates a location of a media segment that contains a predefined amount of media content 120, for example, ten seconds of media content 120. However, in the event that a connection between the encoder 104 and a packager 106 failed, one or more media fragments 121 in the media content 120 may not be received on the packager 106. If one or more media fragments 121 of media content 120 are missing, the content server module 126 creates one or more dummy URLs to take the place of the entries where the URLs for the media segments should be in the index file.

The content server module 126 sends the index file to the reverse proxy server 108, and the reverse proxy server 108 sends it to the client device 110. The client device 110 receives the index file. The index file contains a list of URLs that indicate the location of media segments. The client device 110 sends a request for a media segment at the URL listed in the index file to the reverse proxy server 108. The reverse proxy server 108 selects a packager 106 and sends the request to the packager 106. The reverse proxy server 108 may select the packager 106 randomly or in turn.

When the content server module 126 on the packager 106 receives the request for a media segment at a requested URL, the content server module 126 determines whether it has the corresponding content to serve the request. If the packager 106 cannot provide the media segment, the content server module 126 returns an error code to the reverse proxy server 108. Upon receipt of the error code, the reverse proxy server 108 sends the request for the media segment to a different packager 106. If the reverse proxy server 108 receives an error code from the different packager 106, the reverse proxy server 108 requests the media fragment 121 from yet another packager 106. If an error code is received from every available packager 106, the reverse proxy server 108 sends an error code to the client device 110 indicating that the media content cannot be found.

However, if the content server module 126 has content to serve the request, the content server module 126 generates the requested media segment from the media fragments 121. The media segment is generated from the media fragments 121. For example, each media fragment 121 may comprise four seconds of media content 120, while each media segment sent to a client device comprises ten seconds of media content 120. The content server module 126 generates the requested media segment from one or more media fragments 121. The packager then determines if the media segment for the URL is the same duration as is indicated in the index file. For example, the URL may be identifying a media segment that should be, for example, ten seconds in duration. If the content server module 126 generated the media segment, but the media segment is less than 10 seconds in duration, then a connection interruption between the encoder 104 and packager 106 occurred while the media content was being delivered to the packager 106. Accordingly, the content server module 126 returns an error message to the reverse proxy server 108, which sends the request for the media segment at the specified URL to a different packager 106. If the reverse proxy server 108 receives an error code from the different packager 106, the reverse proxy server 108 requests the media segment from yet another packager 106. If the media segment is complete, the content server module 126 sends the requested media segment to the reverse proxy server 108 and the reverse proxy server 108 sends it to the client device 110.

Figure 2:
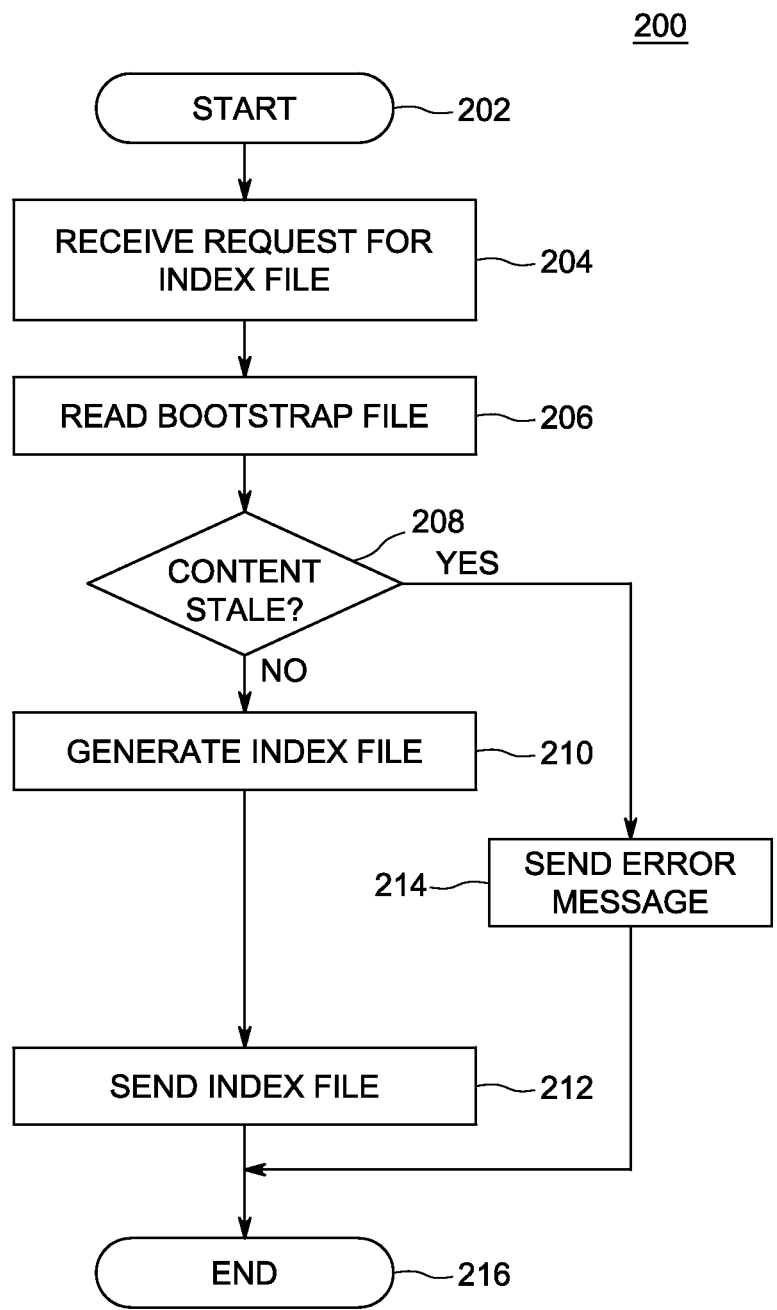
FIG. 2 depicts a flow diagram of a method for supporting liveness failover as performed by the staleness detector of FIG. 1, according to one or more embodiments.

FIG. 2 depicts a flow diagram of a method 200 for supporting liveness failover as performed by the staleness detector 128 of FIG. 1, according to one or more embodiments. The method 200 determines whether the media content at the packager is stale, meaning that a connection between the encoder and the packager has failed and the packager is sending media content that has already been delivered to a client device. The method 200 creates an index file for media content when the media content is current and sends an error message when the media content is stale.

The method 200 starts at step 202 and proceeds to step 204. At step 204, the method 200 receives a request for an index file. An index file comprises a playlist of URLs that each indicate a location for a media segment. The index file also comprises a duration for each media segment. In some embodiments, media segments have .ts file extensions. A typical index file has content such as:

EXTM3U
EXT-X-TARGETDURATION:10
EXTINF:10,
http://media.example.com/filesequence0.ts
EXTINF:10,
http://media.example.com/filesequence1.ts
EXTINF:10,
http://media.example.com/filesequence2.ts
EXTINF:10,
http://media.example.com/filesequence3.ts
EXTINF:10,
http://media.example.com/filesequence4.ts
EXTINF:10,
http://media.example.com/filesequence5.ts
EXT-X-ENDLIST The #EXTINF tag indicates the duration of the .ts file that follows. The URL contains the media segment.

The method 200 proceeds to step 206, where the method 200 reads a bootstrap file. The bootstrap file comprises the current media time for the contents of the media file with which the bootstrap file is associated. The bootstrap file also comprises the details of each fragment of the media content, such as start times, duration, and the like. The current media time is the time until which the index file should be created.

The method 200 proceeds to step 208, where the method 200 determines whether the media content on the packager is stale, meaning no new content has been received, and the media content on the packager has already been sent to the client device. The media content is stale if the last modified time of the bootstrap corresponding to the media stream is older than a threshold interval of time. This means no new media content was received by the packager. If the method 200 determines that the media content is stale, the method 200 proceeds to step 214, where the method 200 facilitates sending an error message to a reverse proxy server. The method 200 proceeds to step 216 and ends.

However, if at step 208, the method 200 determines that the media content is not stale, the method 200 proceeds to step 210, where the method 200 generates the index file. The method 200 uses the current media time from the bootstrap file and generates an index file for a predefined amount of time, for example, 100 seconds. The method 200 assembles the playlist of .ts durations and their associated URLs for the predefined amount of time. For example, if the current media time is X, the index file is created for the media content for 100 seconds from time X to time X-100. If each .ts file is ten seconds in duration, the method 200 creates an index file for the media content starting with the .ts file that starts at time X-100 and includes ten ten-second entries. Thus, the index file contains ten entries, each of ten seconds in duration. However, if the connection between an encoder and a packager failed for a short time, for example for twenty seconds, there may be no media fragments for that period of time. When the method 200 has no media fragments for a duration, the method 200 creates dummy URL entries for the missing content. The dummy URL entries act as placeholders in the index file. Without the placeholders, a media player has no content to request for the missing twenty seconds and as such, the media player would not display any content for the missing twenty seconds. The dummy URL entries allow the media player to understand that twenty seconds of content are required and as such, sends a request for those twenty seconds of content. In this example, the method 200 creates two dummy URL entries to fill the space where the twenty seconds of media content are missing. The index file with dummy entries may be as follows:

EXTM3U
EXT-X-TARGETDURATION:10
EXTINF:10,
http://media.example.com/filesequence0.ts
EXTINF:10,
http://media.example.com/filesequence1.ts
EXTINF:10,
http://media.example.com/dummy1.ts
EXTINF:10,
http://media.example.com/dummy2.ts
EXTINF:10,
http://media.example.com/filesequence4.ts
EXTINF:10,
http://media.example.com/filesequence5.ts
EXT-X-ENDLIST The method 200 proceeds to step 212, where the method 200 facilitates sending the generated index file to the reverse proxy server. The method 200 proceeds to step 216 and ends.

Figure 3:
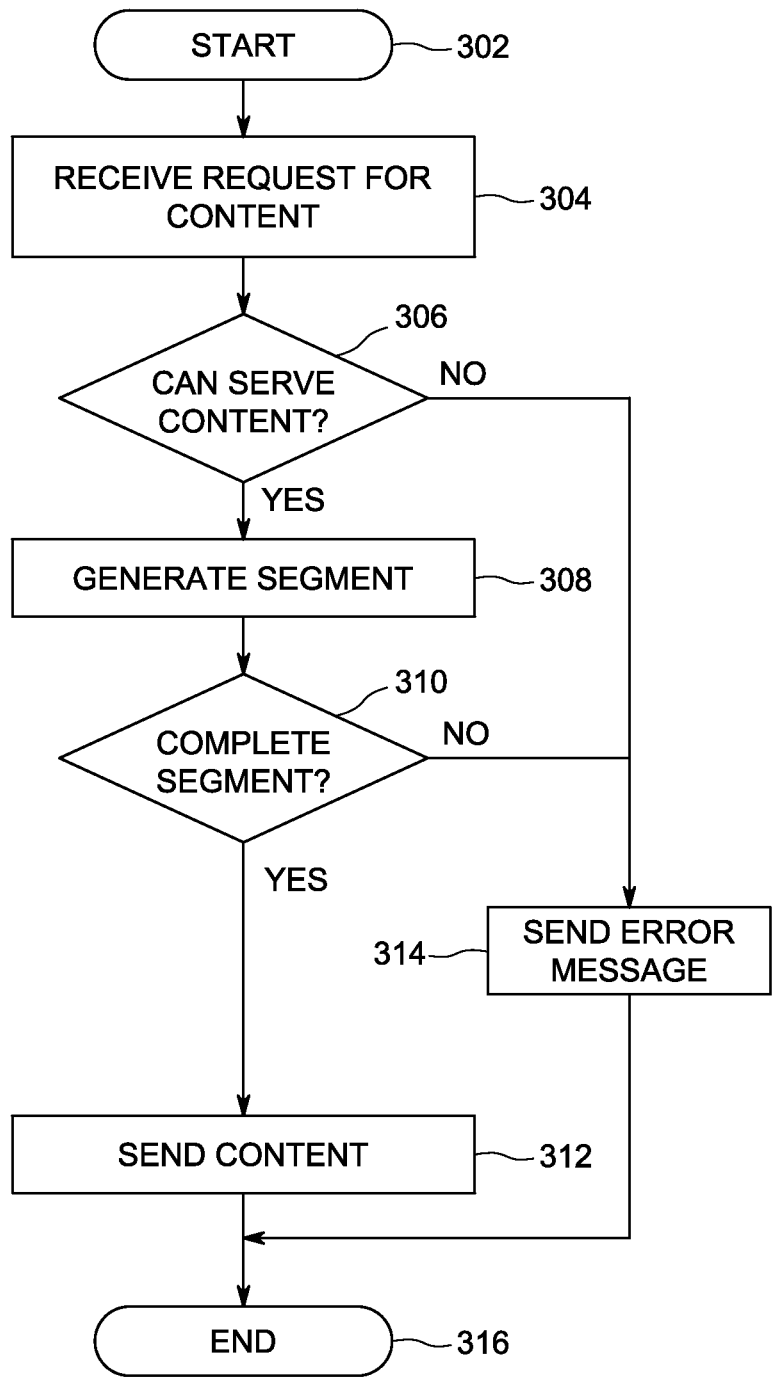
FIG. 3 depicts a flow diagram of a method for supporting failure due to dropout or partial content as performed by the content server module of FIG. 1, according to one or more embodiments.

FIG. 3 depicts a flow diagram of a method 300 for supporting failure due to dropout or partial content as performed by the content server module 126 of FIG. 1, according to one or more embodiments. The method 300 handles a request for a media segment when the requested media segment is not available from the packager from which the media segment is requested. If the media segment is not available, the method 300 facilitates returning an error message to the reverse proxy server, which in turn sends the request for the media segment to a different packager.

The method 300 starts at step 302 and proceeds to step 304. At step 304, the method 300 receives a request for a media segment. The request for a media segment is a request for a particular URL of a media segment of the media content.

The method 300 proceeds to step 306, where the method 300 determines whether there is media content corresponding to the requested segment. If the method 300 determines that there is not media content corresponding to the requested segment, the method 300 proceeds to step 314, where the method 300 facilitates sending an error message to the reverse proxy server. The method 300 proceeds to step 316 and ends.

However, if at step 306, the method 300 determines that there is media content corresponding to the requested segment, the method 300 proceeds to step 308.

At step 308, the method 300 generates the requested segment. The method 300 combines the appropriate media fragments to create the requested segment. For example, a request may be received for a ten second segment. The method 300 accesses the fragments that make up the ten seconds of media content and combines them into a single ten second fragment. If the media fragments comprise four seconds of content each, two fragments and two seconds of a next fragment are combined to create the ten second segment. In some embodiments, the method 300 stores the segment as a .ts file. The method 300 proceeds to step 310.

At step 310, the method 300 determines whether the generated segment associated with the URL is a complete segment or a partial segment. The method 300 accesses the index file to determine the duration of the requested segment. The method 300 then compares the duration from the index file with the actual duration of the generated segment. For example, if the requested segment should be ten seconds in duration, but the actual duration of the generated segment is, for example, only eight seconds in duration, the generated segment is a partial segment. This means the connection between the encoder and the packager failed when a portion of the media content was sent from the encoder to the packager and two seconds of media content were not received. If the method 300 determines the generated segment is a not a complete segment, but rather a partial segment, the method 300 proceeds to step 314.

At step 314, the method 300 facilitates sending an error message from the packager to the reverse proxy server. In response, the reverse proxy server sends the request for the media segment to another packager. All of the packagers receive the same media content. If a connection is broken between the encoder and a first packager, the media content is not received on the first packager. However, the encoder continues to send the media content to all of the other packagers. Therefore, although the first packager could not supply a complete segment, when another packager receives the request, the other packager may then generate a complete segment requested by the reverse proxy server. The method 300 proceeds to step 316 and ends.

However, if at step 308, the method 300 determines the generated segment is a complete segment, the method 300 proceeds to step 312, where the method 300 facilitates sending the generated segment to the reverse proxy server, which then sends it to the client device. The method 300 proceeds to step 316 and ends.

The embodiments of the present invention may be embodied as methods, apparatus, electronic devices, and/or computer program products. Accordingly, the embodiments of the present invention may be embodied in hardware and/or in software (including firmware, resident software, micro-code, etc.), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium include the following: hard disks, optical storage devices, a transmission media such as those supporting the Internet or an intranet, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language, such as Java®, Smalltalk or C++, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

The methods described herein may be implemented in software, hardware, or a combination thereof, in different embodiments. In addition, the order of methods may be changed, and various elements may be added, reordered, combined, omitted, modified, etc. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

The invention claimed is:

1. A computer implemented method comprising:
receiving, at a first media content packager, a request for at least one of an index file of media segments or a media segment;
creating, in response to the request for an index file, an index file comprising a plurality of universal resource locators (URLs); and
sending, from the media content packager an error message when at least one of:
(i) in response to a request for an index file, the created index file is determined to comprise media segments that have previously been sent from a media packager, or
(ii) in response to a request for a media segment, at least one of the URLs in the index file references media content that is not available on the first packager, or a media segment is incomplete, wherein sending the error message results in receiving the request at a second media content packager.

2. The method of claim 1, wherein media content is not available when the index file comprises a dummy URL.

3. The method of claim 1, wherein in response to sending the error message in response to a request for an index file, a media content packager different from the media content packager that sent the error message receives the request for an index file.

4. The method of claim 2, wherein in response to sending the error message in response to a request for a media segment, a media content packager different from the media content packager that sent the error message receives the request for the media segment.

5. The method of claim 1, wherein the created index file is determined to comprise non-current media content when a last modified time of a bootstrap file is not within a predefined interval.

6. The method of claim 5, wherein the bootstrap file is associated with a predefined number of media fragments of the media content and comprises a duration for each of the predefined number of media fragments.

7. The method of claim 1, wherein a media segment is incomplete if a duration of the media segment is less than a duration of the media content as specified in the index file.

8. An apparatus for supporting failover for live streaming comprising:
 a content server module at a media content packager for receiving a request for at least one of a media segment or an index file of media content, wherein the media content comprises a plurality of media segments and creating an index file comprising a plurality of universal resource locators (URLs); and
 a staleness detector for sending an error message when at least one of:
  (i) in response to a request for an index file, the created index file is determined to comprise media segments that have previously been sent from a media packager, or
  (ii) in response to a request for a media segment, at least one of the URLs in the index file references media content that is not available from the content server module, or a media segment is incomplete.

9. The apparatus of claim 8, wherein media content is not available when the index file comprises a dummy URL.

10. The apparatus of claim 8, wherein in response to sending the error message in response to a request for an index file, a media content packager different from the media content packager that sent the error message receives the request for an index file.

11. The apparatus of claim 8, wherein in response to sending the error message in response to a request for a media segment, a media content packager different from the media content packager that sent the error message receives the request for the media segment.

12. The apparatus of claim 8, wherein the created index file is determined to comprise non-current media content when a last modified time of a bootstrap file is not within a predefined interval.

13. The apparatus of claim 12, wherein the bootstrap file is associated with a predefined number of media fragments of the media content and comprises a duration for each of the predefined number of media fragments.

14. The apparatus of claim 8, wherein a media segment is incomplete if a duration of the media segment is less than a duration of the media content as specified in the index file.

15. A non-transient computer readable medium for storing computer instructions that, when executed by at least one processor causes the at least one processor to perform a method for supporting failover for live streaming comprising:
 receiving, at a first media content packager, a request for at least one of an index file of media segments or a media segment;
 creating in response to a request for an index file, an index file comprising a plurality of universal resource locators (URLs); and
 sending, from the media content packager an error message when at least one of:
  (i) in response to a request for an index file, the created index file is determined to comprise media segments that have previously been sent from a media packager, or
  (ii) in response to a request for a media segment, at least one of the URLs in the index file references media content that is not available on the first packager, or a media segment is incomplete,
 wherein sending the error message results in receiving the request at a second media content packager.

16. The computer readable medium of claim 15, wherein media content is not available when the index file comprises a dummy URL.

17. The computer readable medium of claim 15, wherein in response to sending the error message in response to a request for an index file, a media content packager different from the media content packager that sent the error message receives the request for an index file.

18. The computer readable medium of claim 15, wherein in response to sending the error message in response to a request for a media segment, a media content packager different from the media content packager that sent the error message receives the request for the media segment.

19. The computer readable medium of claim 15, wherein the content is determined to be non-current when a last modified time of a bootstrap file is not within a predefined interval.

20. The computer readable medium of claim 15, wherein a media segment is incomplete if a duration of the media segment is less than a duration of the media content as specified in the index file.

* * * * *